TRANSMISSION SYSTEMS FOR THE TRANSMISSION OF PULSES

Filed Feb. 8, 1965

INVENTOR.
LEO E.ZEGERS
JAN KUILMAN
BY

AGENT

United States Patent Office 3,421,146
Patented Jan. 7, 1969

3,421,146
TRANSMISSION SYSTEMS FOR THE TRANSMISSION OF PULSES

Leo Eduard Zegers and Jan Kuilman, Emmasingel, Eindhoven, Netherlands, assignors to North American Philips Company, Inc., New York, N.Y., a corporation of Delaware Filed Feb. 8, 1965, Ser. No. 430,988
Claims priority, application Netherlands, Feb. 8, 1964, 6401057
U.S. Cl. 340—167 6 Claims
Int. Cl. H04q

ABSTRACT OF THE DISCLOSURE

A pulse transmission system for synchronizing pulses in which the pulse sequence is coded before transmission, and decoded after reception, and in which the receiver recovers clock pulses before decoding. The coder and decoder each include a plurality of pulse-retarding devices and modulo-2 adders interconnected to provide an output that is the modulo-2 sum of an input pulse and retarded pulses.

This invention relates to transmission systems for transmission of pulses, comprising a transmitting device, a transmission path and a receiving device. The transmitting device including a pulse source of bivalent information pulses the instants of occurrence of which coincide with a series of equidistant clock pulses, and the receiving device for synchronization thereof including a detecting device for detecting the transitions between two sequential pulses of different values in the incoming waveform.

In such transmission systems the problem arises of synchronizing the receiving device with the transmitting device. It has previously been suggested to synchronize the receiving device by using a synchronizing signal which, at the receiving end, is derived from the transitions between each two sequential pulses of different values. This method of synchronization suffers in practice from the disadvantage that such transitions are absent for a long period if invariably pulses of the same value are transmitted. During this period it is impossible to derive a synchronizing signal from the incoming pulse series at the receiving end and phase differences may thus occur between the receiving and transmitting devices.

An object of the invention is, according to a first aspect thereof, to provide a transmission system of the specified kind in which the probability of the occurrence of periods of long duration in which invariably pulses of the same value are transmitted, is greatly reduced and, according to a second aspect thereof, to prevent the occurrence of such periods which have a duration longer than a predetermined duration.

A transmission system according to the first aspect of the invention is characterized in that the transmitting device includes between the pulse source and the transmitting end of the transmission path, a coding device having an input and an output, the number of pulses applied per unit time to the output being equal to the number of pulses applied per unit time to the input, and that the coding device includes a plurality of pulse-retarding elements and a plurality of modulo-2 adders which combine a plurality of output pulses with different retardation and at least one input pulse, retarded or not retarded, by means of modulo-2 addition into a single output pulse, and that the receiving device includes between the receiving end of the transmission path and a using device, a decoding device having an input and an output, the operation of which is inverse to that of the coding device, and that the decoding device includes a plurality of pulse-retarding elements and a plurality of modulo-2 adders which combine input pulses with different retardation by means of modulo-2 addition into a single output pulse, the detecting device for the purpose of synchronizing the receiving device being coupled via an input to a point of connection located between the receiving end of the transmission path and the input of the decoding device.

A transmission system according to the second aspect of the invention is characterized in that the coding device includes a time-measuring device which, upon occurrence of a series of pulses of equal value at the output of the coding device, causes a predetermined time after the instant of occurrence of the first pulse of this series, which has a different value from the pulse directly preceding it, a pulse at the output of the coding device which has a different value from the pulses of equal value which precede it.

In order that the invention may be readily carried into effect, it will now be described, in detail, by way of example, with reference to the accompanying diagrammatic drawing, in which.

Figures 1, 2:
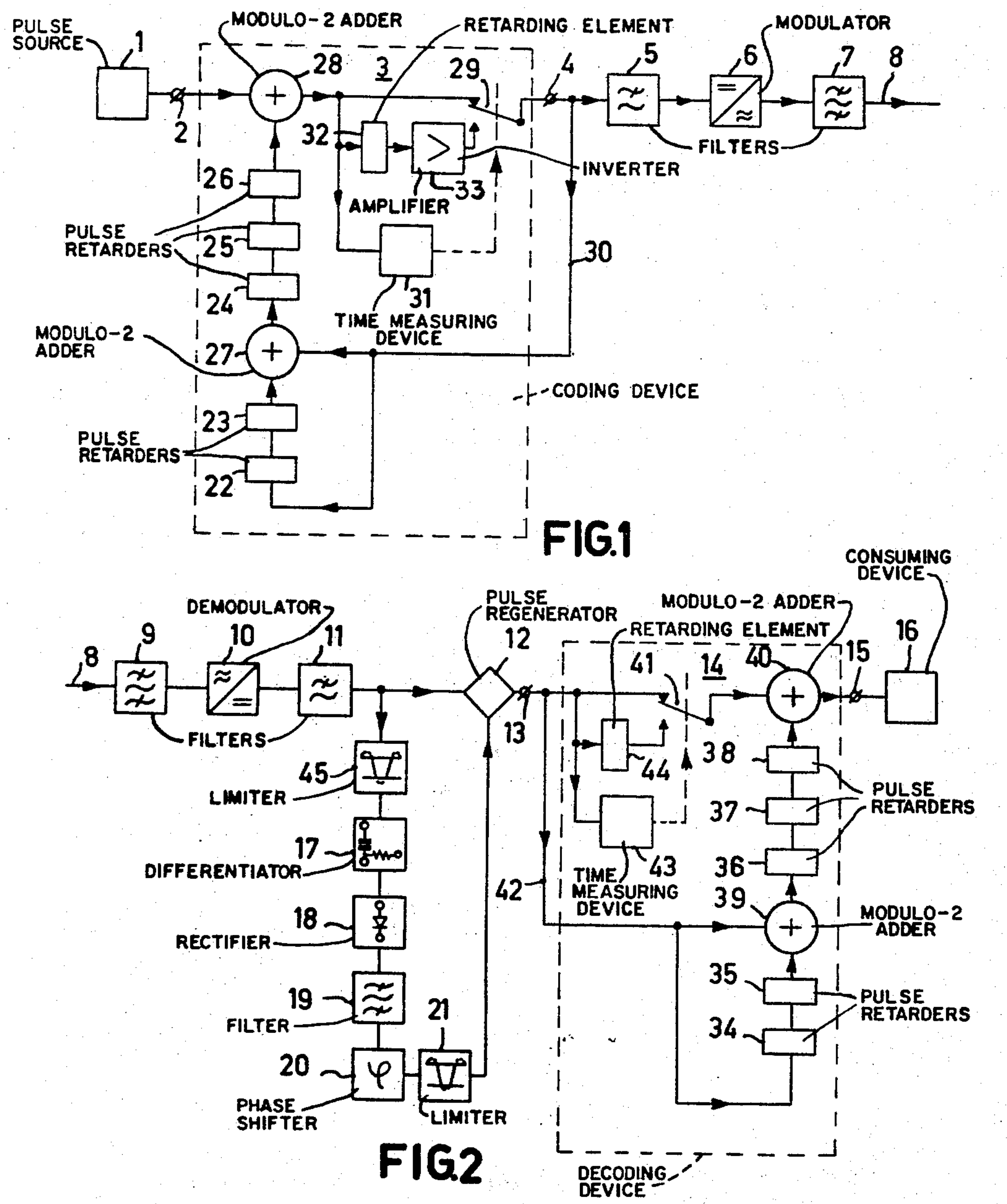
FIGURE 1 shows an example of a transmitting device.
FIGURE 2 shows an example of a receiving device of a transmission system according to the invention.

The transmission system according to the invention considered by way of example has a speed of transmission of 1000 baud, each pulse having a duration of 1 msec. The pulses are transmitted in direct succession and the instants of occurrence of the pulses coincide with a series of equidistant clock pulses having a pulse recurrence frequency of 1000 c./s. The information pulses are bivalent, that is to say an information pulse has either the value 1 or the value 0, these pulses being referred to as a 1-pulse and a 0-pulse respectively. In telegraphy a 1-pulse corresponds to a work element and a 0-pulse corresponds to a rest element. On direct voltage level, that is to say before a modulating stage, if any, and after the demodulating stage, a 1-pulse is distinguished from a 0-pulse by the polarity or the amplitude of the direct voltage while, for example, after frequency modulation a 1-pulse is distinguished from a 0-pulse by an other frequency of the carrier-wave oscillation.

The transmitting device of FIGURE 1 includes a pulse source 1, for example, a telegraph transmitter which applies a series of information pulses to an input 2 of a coding device 3. The pulse series at an output 4 of the coding device passes through a low-pass filter 5 and is applied to a modulating device 6 which modulates the coded series of pulses on a carrier oscillation. The modulated carrier oscillation passes through a bandpass filter 7 and is supplied to the transmitting end of a transmission path 8 through which the modulated carrier oscillation is transferred to the receiving device of FIGURE 2. In this device the incoming modulated carrier oscillation is applied through a bandpass filter 9 to a demodulating device 10 which converts the 0-pulses and 1-pulses modulated on the carrier oscillation into different direct voltages. The direct voltage output signal from the demodulating device passes through a lowpass filter 11 and is applied to a pulse regenerator 12 which regenerates the pulses distorted during transmission converting them into pulses having a constant duration of 1 msec. and a constant amplitude. The regenerated series of pulses is applied to an input 13 of a decoding device 14 which in turn converts the incoming coded series of pulses into the original series of information pulses. The series of information pulses at an output 15 of the decoding device is applied to a consuming device 16, for example, a telegraph receiver, which deals further with the series of information pulses.

The pulse regenerator 12 has two stable positions, hereinafter referred to as "working position" and "rest position," and is switched by the direct output voltage of demodulating device 10 to the working position for each incoming 1-pulse and to the rest position for each incoming 0-pulse, the said pulse regenerator in these different positions providing different direct voltages at its output. The instants when the direct output voltage of the demodulating device can set the pulse regenerator to the working position or the rest position are determined by the rising edges of a rectangular periodic clock signal of 1000 c./s. which is applied from the output of an amplitude limiter 21 to the pulse regenerator. These edges correspond to the desired centres of the incoming pulses so that the value of the direct output voltage of demodulating device 10 during the desired centre of an incoming pulse is always determinative of the position of pulse regenerator 10. The clock signal is derived from the transitions between each two sequential pulses of different values at the output of filter 11, that is to say from the transitions between a 0-pulse and a 1-pulse and between a 1-pulse and a 0-pulse. To this end, the direct output voltage of filter 11 is first limited in amplitude by an amplitude limiter 45, then differentiated by a differentiator 17, and thereafter full-wave rectified by a full-wave rectifier 18. Pulses of the same polarity thus appear at the output of rectifier 18 for each transition between a 0-pulse and a subsequent 1-pulse and the opposite transition between a 1-pulse and a subsequent 0-pulse. The said pulses are applied to a filter 19 tuned to 1000 c./s. and energize this filter. Consequently the filter generates a clock oscillation of 1000 c./s. the phase of which is determined by the mean phase of the output pulses from rectifier 18. The fluctuations in the pulse transitions occurring as a result of noise and interference are averaged by the filter, resulting in a stable clock oscillation being obtained at its output. This sinusoidal clock oscillation is applied through a 90° phase-shifting network 20 to an amplitude limiter 21 which limits the amplitude of the sinusoidal clock oscillation during the positive and negative half waves to a constant value. Due to the 90° phase displacement, the rising edges of the rectangular clock signal coincide, with suitable choice of the polarity thereof, with the centres of the incoming pulses.

In practice the problem arises that the synchronizing pulses from differentiator 17 and from rectifier 18 may be absent during a period which is long relative to the decay period of filter 19. This case occurs if invariably 0-pulses or invariably 1-pulses are received. If this is the case filter 19 starts to decay in its own oscillation and time differences wil occur between the rising edges of the clock signal and the actual centres of the information pulses. The direct output voltage of demodulating device 10 is then not invariably scanned by pulse regenerator 12 during the actual centres of the incoming pulses but at instants differing therefrom. The possibility of errors being made upon regenerating the pulses received after such a series of 0-pulses or 1-pulses greatly increases under these conditions.

The probability of the occurrence of periods of long duration in which invariably 0-pulses or 1-pulses are transmitted is greatly reduced by the use of the afore-mentioned coding device 3 in the transmitting arrangement, the afore-mentioned decoding device 14 in the receiving arrangement ensuring that the coded series of information pulses is again converted into the original series of information pulses. The coding and decoding devices are of known types and have been described in an article by D. A. Huffman "The Synthesis of Linear Sequential Coding Networks," published in: "Proc. of the Symposium on Information Theory," Ac. Press 1956, pages 77–95.

The coding device 3 of FIGURE 1 includes a chain of pulse-retarding elements 22 to 26 each with a retardation period of 1 msec. and includes modulo-2 adders 27 and 28. Each of the modulo-2 adders has two inputs indicated by an arrow pointing towards the switching symbol and an output indicated by an arrow pointing away from the switching symbol. The said adders, like a binary half adder, have the property to deliver a 0-pulse if pulses of the same value simultaneously occur at both inputs and to deliver a 1-pulse if the two input pulses occurring simultaneously have different values. The pulses at the input 2 of the coding device are applied to an input of modulo-2 adder 28 and the output pulses thereof are applied through a switching contact 29, which normally occupies the rest position shown, to the output 4. The output pulses are fed back from the output 4 to the coding device through a line 30 and in the coding device these pulses are applied to the pulse-retarding element 22 and to an input of modulo-2 adder 27. The output pulse applied to the pulse-retarding element 22 is applied through the retarding elements 22 and 23 having a total retardation time of 2 msec. to a second input of modulo-2 adder 27. An output pulse from the coding device and an output pulse therefrom retarded by 2 msec. thus simultaneously appear at the two inputs of the modulo-2 adder 27 or, in other words, an output pulse and the second preceding output pulse. The adder 27 forms a sum pulse from the two simultaneously occurring input pulses and applies it to the output of the adder. The said sum pulses is applied throught the retardation elements 24 to 26 having a total retardation time of 3 msec. to a second input of modulo-2 adder 28. An information pulse from pulse source 1 appears at one input of said adder and the modulo-2 sum of the fifth and third preceding output pulses simultaneously appears at the other input thereof. The adder 28 forms a sum pulse from the two simultaneously-occurring input pulses and applies it to the output of the adder. The last-mentioned sum pulse is thus equal to the modulo-2 of an information pulse and the fifth and third preceding output pulses. Due to the feedback coupling through the line 30 the coding device is capable of generating a series of 0-pulses and 1-pulses during a period in which pulse source 1 emits a series of information pulses of the same value. If pulse source 1 at a given instant starts to emit a series of 0-pulses, which may occur at the beginning of an interval or if the information itself contains such a series of 0-pulses, and if at this instant at least one of the retarding elements 22 to 26 contains a 1-pulse, this 1-pulse is fed back through the output 4 and line 30 to the pulse-retarding elements. Consequently a series of 0- and 1-pulses keeps circulating through the coding device.

The series of output pulses from the coding device, hereinafter referred to as 0-series, has a recurrence period of 31 0-pulses and 1-pulses: (0000100101100111110001101110101). During such a period several transitions occur between sequential pulses of different values and these transitions maintain the synchronisation of the receiving device during the period in which pulse source 1 emits only 0-pulses. It is also possible that from a given instant the pulse source 1 starts to emit only 1-pulses. In this case the coding device may generate a series of 0- and 1-pulses, hereinfter referred to as 1-series, of which the transitions between sequential pulses of different values maintain the synchronisation. The 1-series is the inverse of the 0-series and the period of the 1-series may be found by replacing the 0-pulses by 1-pulses, and the 1-pulses by 0-pulses in the above-mentioned period of the 0-series. Outside the periods in which the pulse source 1 emits a series of 0-pulses or 1-pulses, the series of information pulses is coded into a new pulse series which invariably contains 0- and 1-pulses. The coded pulse-series thus invariably contains transitions between 0- and 1-pulses so that continuous synchronisation of the receiving device is ensured.

In the pulse-retarding elements 22 to 26 five pulses are always present at each pulse instant, each pulse having either the value 1 or the value 0. Normally the combination of the pulses present in the retarding elements at a given pulse instant differs from the combination of pulses at the pulse instant directly preceding it. However, it may occur that the pulse combination does not vary. This case occurs if at the instant when the pulse source 1 starts to emit a series of 0-pulses, all pulses present in the retarding elements 22 to 26 have the value 0. The probability of this pulse combination occurring is small, however, since in total 32 possible pulse combinations exist and the pulses present in the retarding elements at the relevant instant may occur in one of the 32 combinations. If, however, all pulses have the value 0 at the relevant instant, the coding device provides a series of 0-pulses and these do not cause any change in the contents of the retarding elements. The said case also occurs if the pulse source 1 starts to emit a series of 1-pulses at an instant when the retarding elements 24 to 26 contain a 0-pulse and the retarding elements 22 to 23 contain a 1-pulse. The coding device then provides a series of 1-pulses and these do not cause any change in the contents of the retarding elements. In the last-mentioned case the sum pulse of the adder 27 always is a 0-pulse obtained by adding two 1-pulses, 0-pulses invariably being applied to the second input of modulo-2 adder 28. All the information pulses at the first input of adder 28 have the value 1 so that all the sum pulses of this adder also have the value 1.

The coding device 3 of FIGURE 1 includes a time-measuring device 31 which is connected via an input to the output of modulo-2 adder 28. The coding device also includes a retarding element 32 having a retardation time of 1 msec., which is connected via an input to the output of modulo-2 adder 28 and the output of which is connected to a reversing amplifier 33. The time-measuring device 31 counts the sequential output pulses from the adder 28 which have the same value and again starts to count after each pulse having a different value from the pulse directly preceding it. After a series of, for example, 30 sequential pulses of the same value, the time-measuring device 31 responds and sets the switching contact 29 from the rest position shown to the other position, hereinafter referred to as working position, during the first output pulse from the adder 28 which follows after the series of 30 pulses. The said output pulse is therefore not emitted. Instead of this pulse the final pulse of the series of 30 pulses shared in the retarding element 32 is emitted through the reversing amplifier 33 and the switching contact 29. The reversing amplifier converts a 0-pulse into a 1-pulse and a 1-pulse into a 0-pulse. Thus, after a series of 30 0-pulses, a 1-pulse is invariably emitted and, after a series of 30 1-pulses, a 0-pulse is invariably emitted. This 1-pulse or 0-pulse is fed back again to the coding device through line 30 and ensures that the contents of the pulse-retarding elements are changed. From this instant the coding device can again generate a 0-series or a 1-series which maintains the synchronisation of the receiving device.

The time-measuring device 31 ensures that a predetermined time after the instant of occurrence of the first pulse of a series of 0-pulses or a series of 1-pulses at the output of the coding device, a pulse of a different value is emitted. In the example shown, this is effected by retarding an output pulse from adder 28 by 1 msec. and, after its value has been changed, re-emitting this pulse. A similar result is obtained by carrying out this operation on the information pulses applied to an input of adder 28. However, the time-measuring device 31 must invariably remain connected via its input to the output of adder 28. The effect of the operation of time-measuring device 31 thus resides in that the pulse source 1, after a series of 30 information pulses of equal value, apparently emits a pulse of the other value.

The decoding device 14 of FIGURE 2 similarly contains a chain of pulse-retarding elements 34 to 38 and modulo-2 adders 39 and 40. The pulses at the input 13 of the decoding device are applied through a switching contact 41, which normally occupies the rest position shown, to a first input of modulo-2 adder 40 and the output pulses thereof are applied to the output 15. The pulses at the input 13 are also applied through a line 42 to the decoding device and applied therein to the retarding element 34 and to an input of modulo-2 adder 39. Similarly as in the coding device, a pulse equal to the modulo-2 sum of the fifth and third preceding input pulses appears at the second input of the adder 40. The output pulse of the adder 40 is equal to the modulo-2 sum of the input pulse and the fifth and third preceding input pulses appearing at this instant at the input 13. Since the first-mentioned pulse is the pulse emitted by the transmitting device, it is equal to the modulo-2 sum of the emitted information pulse and the fifth and third preceding pulses, the output pulse of adder 40 being equal to the emitted information pulse. The series of information pulses emitted by pulse source 1 thus appears at the output 15.

The decoding device includes a time-measuring device 43 which corresponds to the time-measuring device 31 in the coding device. An input of time-measuring device 43 is connected to the input 13 of the decoding device. The decoding device also includes a retarding element 44 having a retardation time of 1 msec., which is connected via an input to input 13 of the decoding device. The time-measuring device 42 responds after a series of 30 sequential 0-pulses or 1-pulses at input 13 and sets the switching contact 41 to the working position during the next-following pulse. Due to the action of time-measuring device 31 in the coding device, the said pulse has the value 1 after a series of 30 0-pulses and the value 0 after a series of 30 1-pulses. When it is applied to adder 40, a 1-pulse appears at the output thereof likewise after a series of 30 0-pulses and a 0-pulse after a series of 30 1-pulses. The time-measuring device 43 ensures that the pulse received after a series of 30 0-pulses or 1-pulses is not applied to adder 40 and that the final pulse of the series of 30 pulses stored in the retarding element 44 is again applied to adder 40. A series of 31 0- or 1-pulses then appears at the output of coding device 40, thus restoring the original series of information pulses.

The operation performed by time-measuring device 43 on the input pulses at the first input of adder 40 can also be carried out on the input pulses at the other input or on the output pulses without the envisaged result being changed thereby. However, the time-measuring device must invariably remain connected via its input to the input of the coding device. The operation of the time-measuring devices has otherwise no influence on the coding and the decoding operation which normally takes place. The only effect is that apparently an information pulse of a differing value is emitted and that this pulse is corrected again upon reception. However, this information pulse of differing value has the important consequence that the coding device starts to generate a 0-series or a 1-series.

In the foregoing it has been assumed that a series of 0-pulses or a series of 1-pulses emitted by pulse source 1 contain not exactly 30 pulses but either more or fewer pulses. If such a series contains exactly 30 pulses the 31st pulse has a value different from that of the preceding pulses. In this case also the 31st pulse is converted by time-measuring device 43 into a pulse having the same value as the 30 preceding pulses. Under these conditions an error is introduced into the series of information pulses. The possibility of an error being made is very small since two conditions have to be satisfied the fulfilment of which is very improbable. The first condition is that at the instant when pulse source 1 starts to emit a series of 0-pulses or a series of 1-pulses, the pulses in the retarding elements 22 to 26 occur in a combination which prevents the generation of a 0- or a 1-series, and the second condition is that the series of 0-pulses or the series of 1-pulses contains exactly 30 pulses.

What is claimed is:

1. In a pulse transmission system of the type having a transmitter, a receiver, and a transmission path interconnecting said transmitter and receiver, said transmitter including a source of bivalent information pulses having pulse instants that coincide with a series of equidistant clock instants, and means for applying the output of said source to said path, said receiver including means for receiving pulses from said path, means for detecting the time of occurrence of transitions between sequential received pulses of different level, means connected to said detecting means for regenerating a pulse signal from said received pulses that is synchronized with said transitions, output means, and means applying the output of said regenerating means to said output means; the improvement wherein said means applying the output of said source to said path comprises pulse coding means, and said means applying the output of said generating means to said output means comprises pulse decoding means, said coding and decoding means each comprising a plurality of pulse retarding means, a plurality of modulo-2 adders, an input terminal, an output terminal, and means interconnecting the respective retarding means and adders whereby the output at the respective output terminal is the modulo-2 sum of pulses at the respective input terminal and retarded pulses at another point in said respective coding and decoding means.

2. The system of claim 1 in which said coding means comprises first and second modulo-2 adders, means applying pulses from the output terminal of said coding means to said first adder by first and second paths one of which includes pulse retarding means, means applying the output of said first adder to said second adder by way of pulse retarding means, means applying pulses at the input terminal of said coding means to said second adder, and means connecting the output of said second adder to said output terminal of said coding means.

3. The system of claim 1 in which said decoding means comprises first and second modulo-2 adders, means applying pulses at said input terminal of said decoding means to said first adder and to said second adder by way of first and second paths one of which includes pulse retarding means, means applying the output of said second adder to said first adder by way of pulse retarding means, and means applying the output of said first adder to said output terminal of said decoding means.

4. The system of claim 1 wherein said coding means further comprises time measuring means connected to count the number of sequential pulses of the same level appearing at said output terminal of said coding means, and means responsive to a predetermined count in said counting means connected to change the level of a pulse at said output terminal of said coding means.

5. The system of claim 1 wherein said decoding means further comprises time measuring means connected to count the number of sequential pulses of the same level appearing at said input terminal of said decoding means, and means responsive to a predetermined count in said counting means for changing the level of a pulse at the input terminal of said decoding means.

6. In a pulse transmission system of the type hvaing a transmitter, a receiver, and a transmission path interconnecting said transmitter and receiver, said transmitter including a source of bivalent information pulses having pulse instants that coincide with a series of equidistant clock instants, and means for applying the output of said source to said path, said receiver including means for receiving pulses from said path, means for detecting the time of occurrence of transitions between sequential received pulses of different level, means connected to said detecting means for regenerating a pulse signal from said received pulses that is synchronized with said transitions, output means, and means applying the output of said regenerating means to said output means; the improvement wherein said means applying the output of said source to said path comprises pulse coding means, and said means applying the output of said generating means to said output means comprises pulse decoding means, said coding and decoding means reach comprising a plurality of pulse retarding means, a plurality of modulo-2 adders, an input terminal, and an output terminal, said coding means comprising means interconnecting the respective pulse retarding means and modulo-2 adders whereby the output at the output terminal of said coding means is the modulo-2 sum of pulses at the input terminal of said coding means and retarded pulses at the output terminal of said coding means, said decoding means comprising means interconnecting the respective pulse retarding means whereby the output at the output terminal of said decoding means is the modulo-2 sum of the input at the input terminal of said decoding means and retarded pulses at the input terminal of said decoding means.

References Cited

UNITED STATES PATENTS

| | | |
|---|---|---|
| 3,267,213 | 8/1966 | Berger. |
| 3,065,302 | 11/1962 | Kaneko. |
| 3,038,029 | 6/1962 | Carbrey. |

JOHN W. CALDWELL, *Primary Examiner.*

D. J. YUSKO, *Assistant Examiner.*

U.S. Cl. X.R.

178—69